J. J. WHEELEN.
SLED.
APPLICATION FILED DEC. 2, 1912.
1,060,523.
Patented Apr. 29, 1913.
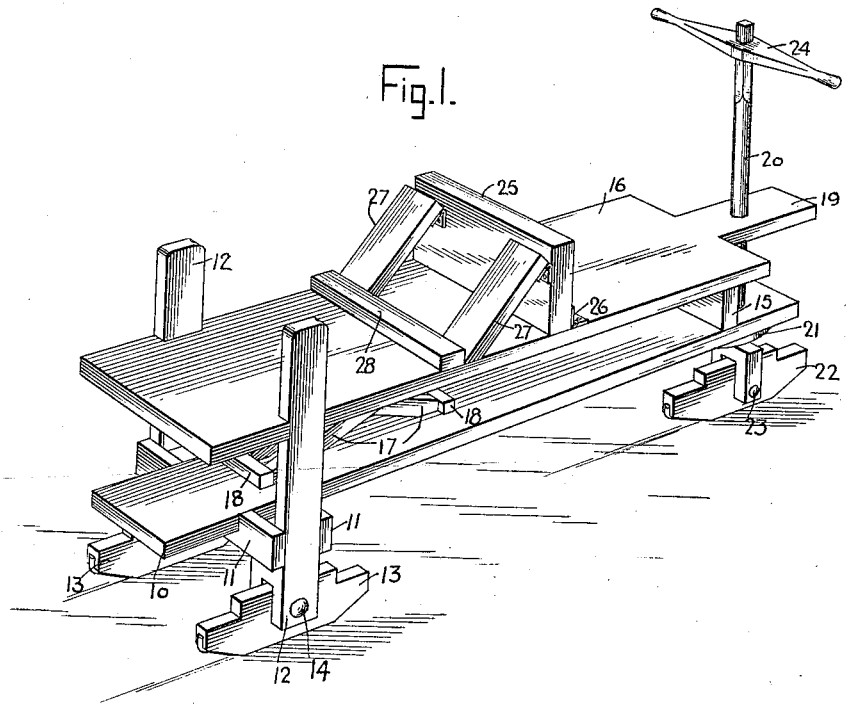
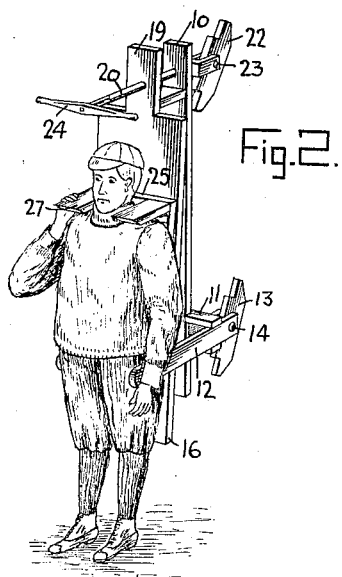
WITNESSES
E. K. Reichenbach.
B. Joffe
INVENTOR
JOHN J. WHEELEN
BY Munn & Co
ATTORNEYS

UNITED STATES PATENT OFFICE.

JOHN JOSEPH WHEELEN, OF GARDNER, MASSACHUSETTS.

SLED.

1,060,523.  Specification of Letters Patent.  Patented Apr. 29, 1913.

Application filed December 2, 1912. Serial No. 734,551.

*To all whom it may concern:*

Be it known that I, JOHN J. WHEELEN, a citizen of the United States of America, and a resident of Gardner, in the county of Worcester and State of Massachusetts, have invented a new and Improved Sled, of which the following is a full, clear, and exact description.

The invention relates to sleds and has for its object an inexpensive, compact sled, light in weight and solid in construction, which can be used on level ground as well as on hills, which can be easily steered, and, when necessary, transported by the rider.

The above is accomplished by providing a frame mounted on runners, one of which is steerable, and a seat on the frame having a collapsible back rest, which has means for facilitating the transportation of the sled by the rider.

The invention consists of the construction and combination of parts to be more fully described hereinafter and fully set forth in the claims.

Reference is to be had to the accompanying drawings forming a part of this specification, in which like characters indicate corresponding parts in both views and in which:

Figure 1 is a perspective view of an embodiment of my invention; and Fig. 2 is a perspective view showing the way the sled is carried by the rider.

Referring to the drawings, 10 represents a longitudinal member forming the bed of the frame; engaging transversely the same, near its rear end, are members 11 which are partly under cut and are flush with the upper face of the bed. Engaging the transverse member 11 at each end thereof are standards 12, the lower end of which is bifurcated and engages runners 13 which are pivotally mounted in the bifurcated ends of the standards 12 by means of a bolt 14 sitting in the bifurcated end of the standard. Near the forward end of the bed a transverse piece 15 is placed on the upper face of the bed 10.

Resting on the transverse member 15 is a seat 16 running parallel to and above the bed 10 and engaging the standards 12. The rear end of the seat 16 is supported on the bed 10 by means of cross bars 17 abutting against transverse bars 18 positioned on the upper surface of the frame bed 10. The front end of the seat 16 is provided with a central extension 19 through which projects the steering rod 20. The steering rod 20 also projects through the bed 10 and is provided with a flange member 21 contacting with the lower surface of the bed. The lower end of rod 20 below the flange 21 is bifurcated and engages a runner 22 similar to shoes 13 also pivoted in the bifurcation of the steering rod 20 by means of a bolt 23.

The bifurcated portion on the steering rod and the flange member 21 are rigidly connected to the rod 20, so that when the rod 20 is turned the flange 21 and the bifurcation of the steering lever 20 revolve with it and thereby carry the runner in the direction turned. The steering rod 20, at its upper end, is angular-shaped, with the handle bar 24 snugly fitted on same so that it can be displaced longitudinally on the steering rod, thereby persons of different heights, when steering the sled, can displace the handle bars on the steering rod to suit themselves.

The seat 16 is, near its middle, provided with a transverse member 25 hinged to the seat transversely by means of hinges 26 so that the same may collapse toward the steering rod; and when erect it forms a back supporting rod for the rider, who straddles the seat of the sled. The back rest 25, on its side facing the back of the sled is provided with two abutting members 27 hinged near the upper end of the back rest, and near each end thereof, a cross bar 28 is attached to the seat 16 against which the abutting members 27 normally rest when the back rest 25 is erect. The space behind the cross bar 28 constitutes a seat for a passenger, who may also straddles the seat; the two passengers sitting back to back when traveling on the sled. When the rider desires to transport the sled he folds the back rest 25 toward the seat 16 with the abutting members 27 raised, as shown in Fig. 2, and each resting on a shoulder of the person desiring to carry the sled, as shown in Fig. 2. The standard 12 engages the sides of the person and prevents the displacement of the sled when carried.

Having thus described my invention, what I claim and desire to secure by Letters Patent is:

1. In a sled, a frame; supporting runners for said frame; a seat on said frame; a member pivotally attached to the top of said seat near the middle thereof and normally erect on same; and abutting members pivotally attached to said member and resting on said seat.

2. In a sled, a frame; supporting members for said frame; a seat on said frame; a collapsible member transversely mounted on said seat; a pair of collapsible abutting members attached to said collapsible member near its side thereof; and a cross bar on the top of said seat normally forming a stop for said collapsible abutting members on said seat, thereby said collapsible member being normally erect on said seat.

In testimony whereof I have signed my name to this specification in the presence of two subscribing witnesses.

JOHN JOSEPH WHEELEN.

Witnesses:
    MARGARET ELLEN WHEELEN,
    MARY SERENA NORRIS.

---

Copies of this patent may be obtained for five cents each, by addressing the "Commissioner of Patents, Washington, D. C."